United States Patent
Fluch et al.

(10) Patent No.: US 11,107,628 B2
(45) Date of Patent: Aug. 31, 2021

(54) COIL AND ELECTRICAL STRIP OR ELECTRICAL SHEET

(71) Applicant: VOESTALPINE STAHL GMBH, Linz (AT)

(72) Inventors: Ronald Fluch, Linz (AT); Roman Tiefenthaller, Vöcklabruck (AT)

(73) Assignee: voestalpine Stahl GmbH, Linz (AT)

( * ) Notice: Subject to any disclaimer, the term of this patent is extended or adjusted under 35 U.S.C. 154(b) by 0 days.

(21) Appl. No.: 15/561,284

(22) PCT Filed: Mar. 24, 2016

(86) PCT No.: PCT/EP2016/056687
§ 371 (c)(1),
(2) Date: Sep. 25, 2017

(87) PCT Pub. No.: WO2016/151129
PCT Pub. Date: Sep. 29, 2016

(65) Prior Publication Data
US 2018/0122573 A1    May 3, 2018

(30) Foreign Application Priority Data
Mar. 24, 2015   (EP) .................................... 15160680

(51) Int. Cl.
| | | |
|---|---|---|
| *H01F 41/04* | (2006.01) | |
| *C09D 163/00* | (2006.01) | |
| *C21D 8/12* | (2006.01) | |
| *C08G 59/40* | (2006.01) | |
| *H01F 5/02* | (2006.01) | |

(52) U.S. Cl.
CPC ......... *H01F 41/04* (2013.01); *C08G 59/4021* (2013.01); *C09D 163/00* (2013.01); *C21D 8/1277* (2013.01); *H01F 5/02* (2013.01)

(58) Field of Classification Search
CPC .................. C09D 7/61; C09D 163/00–163/10
See application file for complete search history.

(56) References Cited

U.S. PATENT DOCUMENTS

| | | | | |
|---|---|---|---|---|
| 2005/0189067 A1* | 9/2005 | Wimmer | ............ | C08G 59/4021 156/330 |
| 2007/0231463 A1* | 10/2007 | Huang | ............... | C08G 59/4021 427/58 |
| 2015/0017428 A1* | 1/2015 | Kim | ......................... | H01B 3/40 428/331 |
| 2015/0044475 A1* | 2/2015 | Nakagawa | ............... | C21D 9/46 428/418 |
| 2015/0105492 A1* | 4/2015 | Chen | ....................... | C08L 63/00 523/401 |
| 2017/0298236 A1* | 10/2017 | Ott | ....................... | C09D 163/00 |

FOREIGN PATENT DOCUMENTS

| | | | | |
|---|---|---|---|---|
| DE | 69611009 T2 | 6/2001 | | |
| EP | 0008811 A1 | 3/1980 | | |
| WO | WO-2009079540 A1 * | 6/2009 | ........... | C09D 177/12 |
| WO | 2014089593 A1 | 6/2014 | | |

OTHER PUBLICATIONS

Van Nostrand's Scientific Encyclopedia entry on Pigments (Inorganic) (Year: 2006).*

* cited by examiner

*Primary Examiner* — Ramsey Zacharia

(57) ABSTRACT

A coil and an electrical strip or electrical sheet with at least one heat-hardening hotmelt varnish, namely a baked enamel layer, provided on its flat sides, which has an epoxy resin base, at least one hardener, and at least one filler, are disclosed. In order to achieve a high storage stability and long-term temperature stability, the proposal is made for the filler of the baked enamel layer to have a metal carbonate, sulfate, sulfide, silicate, or phosphate or any mix of a plurality of these.

12 Claims, 1 Drawing Sheet

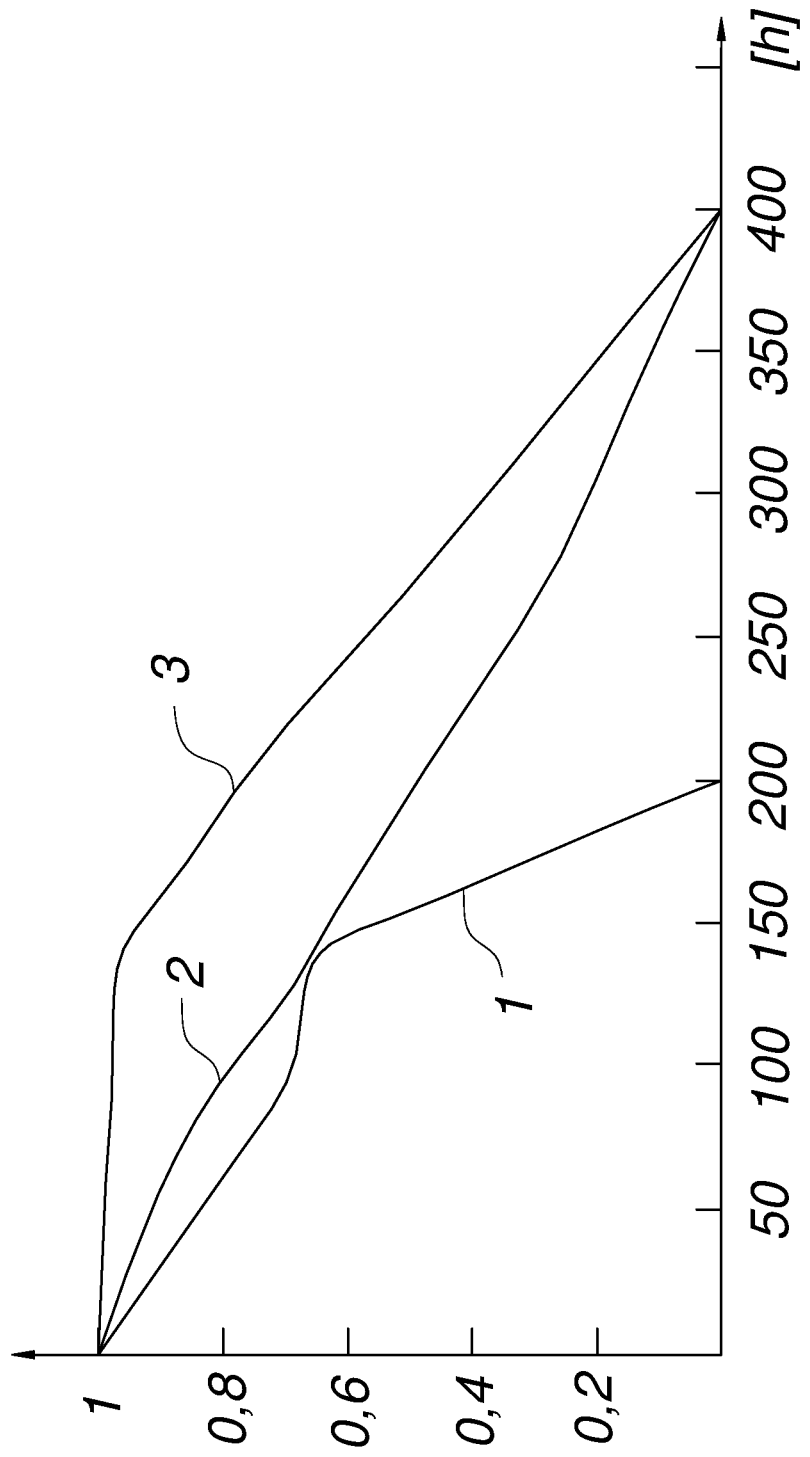

COIL AND ELECTRICAL STRIP OR ELECTRICAL SHEET

FIELD OF THE INVENTION

The invention relates to an electrical strip or electrical sheet with at least one heat-hardening baked enamel layer provided on its flat sides, which has an epoxy resin base, at least one hardener, and at least one filler.

BACKGROUND OF THE INVENTION

As a coating for electrical strips or electrical sheets, heat-hardening hotmelt varnishes and baked enamels are known from the prior art (WO2014/089593A1).

In the prior art, a heat-hardening hotmelt varnish—also known as baked enamel—is understood to be a reactive adhesive system containing hotmelt adhesive. A hotmelt varnish of this kind, which is known for example from EP0008811A1, can for example be a solution of a heat-hardening or thermosetting hotmelt adhesive. After the removal of the solvent, this hotmelt adhesive, by means of the so-called baking process, i.e. through the supply of heat, can be induced to first adhere and then harden.

Laminated cores made of electrical strips or electrical sheets with heat-hardening, epoxy resin-based baked enamel layers, however, disadvantageously exhibited a reduced durability. After the final cross-linking of the baked enamel, an adhesive strength and an electrical insulation resistance that decrease significantly over the duration of use were observed. The possibility of counteracting these disadvantages with an increased cross-linking density in the cured baked enamel layer, however, is limited by the storage stability of electrical strips or electrical sheets with heat-hardening baked enamel.

SUMMARY OF THE INVENTION

Based on the prior art that was explained at the beginning, therefore, the stated object of the invention is to modify the epoxy resin-based baked enamel layer in such a way that on the one hand, the electrical strip or electrical sheet with the heat-hardening and thus still curable baked enamel layer can have a high storage stability and on the other hand, the products made from this electrical strip or electrical sheet with a finally cross-linked baked enamel layer can have a high durability.

The object of the invention is attained by the fact that the filler of the baked enamel layer contains a metal carbonate, sulfate, sulfide, silicate, or phosphate or any mix of a plurality of these.

If the filler of the baked enamel layer contains a metal carbonate, sulfate, sulfide, silicate, or phosphate or any mix of a plurality of these, it has been surprisingly observed that this can be used to significantly increase the durability of the bonded baked enamel compound in the finally cross-linked state. In particular, an increased long-term temperature stability has been observed, which can ensure an increased peel strength of the bonded, bake-hardened baked enamel compound of a laminated core, for example, even after a comparatively long service life.

These advantages share the fact that a change of the cross-linking density of the baked enamel layer is not absolutely necessary so that according to the invention, a comparatively high storage stability can also be achieved for the electrical strip or electrical sheet that is coated with a heat-hardening and thus heat-hardenable or cross-linkable, i.e. reactive, baked enamel. Metal carbonate and metal sulfate have turned out to be particularly preferable as fillers, compared to the other fillers. In comparison to the other fillers, metal carbonate and metal sulfate can specifically result in improvements not only in the storage stability of the liquid baked enamel, but also in the strength of the cured baked enamel. This is particularly true of calcium carbonate as the metal carbonate and barium sulfate as the metal sulfate. In addition, the fillers according to the invention can improve the dimensional stability of a stored coil made of the electrical sheet according to the invention with a still cross-linkable baked enamel layer or hotmelt varnish layer. For example, the fillers can contribute to increasing the surface roughness of the baked enamel layer and can thus hinder an autonomous unrolling of the electrical strip. In general, it should be noted that this can be particularly advantageous if both flat sides of the electrical strip have a baked enamel layer.

If the heat-hardening baked enamel layer contains 5 to 25% by volume or 5 to 20% by volume of filler, then this can prevent a possible increase of the layer thickness in an unpressurized heat hardening of the baked enamel layer, which can be attributed to a spring-back effect during the heating phase of the baked enamel layer. The fillers according to the invention, however, reduce the flow capability of the baked enamel layer to such an extent that until the onset of the chemical reaction, no spring-back and thus no increased layer thickness of the baked enamel layer can occur in the cross-linked state. In this case, preferably even 7 to 16% by volume of filler can be an excellent option.

An advantageous composition can be achieved if the heat-hardening baked enamel layer contains 6 to 10% by volume of hardener and 74 to 85% by volume of the epoxy resin as a base, for example in the form of a residue. In addition to the epoxy resin base in the form of a residue, the baked enamel layer can also contain potential impurities.

For example, calcium carbonate ($CaCO_3$) can be an excellent option for the metal carbonate for the filler. Calcium carbonate can have a comparatively high oxidation resistance, which can significantly increase the stability of the baked enamel. In addition, the structure of calcium carbonate in the hardened baked enamel can excel in increasing the strength.

A further contribution to increasing the strength of the hardened baked enamel can be made if a metal sulfate in the form of barium sulfate ($BaSO4$) is used as a filler.

For example, zinc sulfide (ZnS) can be an excellent option for the metal sulfide for the filler. For example, magnesium silicate ($MgO_3Si$) or aluminum silicate can be excellent options as the metal sulfide for the filler. In addition, zinc phosphate $Zn_3(PO_4)_2$ can be an excellent option for the metal phosphate. Furthermore, lithopone, for example can be an excellent option for the mixture.

The adhesive strength of the cross-linked baked enamel layer can be further increased if the filler has an average grain size of 0.6 to 3 μm.

If the hardener has a dicyandiamide base, then this can make a further contribution to increasing the storage stability of the baked enamel layer.

In order to facilitate the machining of the electrical strip or electrical sheet, the baked enamel layer can have at least two hardeners that have a different reactivity with the epoxy resin base, for example at room temperature and/or in the drying process of the baked enamel layer—for example at 180 to 240 degrees Celsius. It is therefore possible to adjust the storage stability and/or the viscosity of the baked enamel layer through a pre-reaction of one of the two hardeners.

Excellent mechanical properties and a good tackiness can be assured if the epoxy resin base is bisphenol A (2,2-bis-(4-hydroxyphenyl)-propane). In general, it should be noted that the epoxy resin base can be based on glycidyl ethers of multivalent phenols, an example of which is bisphenol A.

Preferably, the electrical strip or electrical sheet has the heat-hardening baked enamel layer on both of its flat sides in order to protect it from external influences and thus to facilitate its further processing.

Preferably, the electrical strip or electrical sheet can be wound into a coil and in this wound state, because of the fillers according to the invention, can ensure a high dimensional stability of the coil. This is also true, for example, if the electrical strip or electrical sheet has the heat-hardening baked enamel layer on both of its flat sides.

The invention can particularly excel if a metal carbonate, sulfate, sulfide, silicate, or phosphate or any mix of a plurality of these is used as a filler in a heat-hardening baked enamel with an epoxy resin base and a hardener for increasing the dimensional stability of a coil composed of a wound electrical strip or electrical sheet that is coated with the baked enamel on at least one of its flat sides.

In addition, a metal carbonate, sulfate, sulfide, silicate, or phosphate or any mix of a plurality of these can be used as a filler in a heat-hardening baked enamel with an epoxy resin base and a hardener for increasing the long-term temperature resistance of a laminated core made of electrical strip or electrical sheet; the electrical strip or electrical sheet is coated with the baked enamel on at least one of its flat sides.

These technical effects according to the invention can already be possible with 5 to 25% by volume, 5 to 20% by volume, or even 7 to 16% by volume of metal carbonate, sulfate, sulfide, silicate, or phosphate or any mix of a plurality of these.

BRIEF DESCRIPTION OF THE DRAWING

FIG. 1 is a graph showing the peel strengths of different baked enamel layers.

DETAILED DESCRIPTION OF THE PREFERRED EMBODIMENTS

The invention will be explained in greater detail below by way of example based on an exemplary embodiment.

To prove the achieved effects, electrical strips with different compositions were coated with baked enamel and these baked enamel-coated electrical strips were studied for shelf life and peel strength after 200 hours of operation at 200 degrees Celsius.

The various baked enamel layers are listed in Table 1.

TABLE 1

Overview of the baked enamel layers studied

| Baked enamel layer | Epoxy resin base | Filler | Hardener |
|---|---|---|---|
| 1 | bisphenol A | No filler | dicyandiamide |
| 2 | bisphenol A | $CaCO_3$ | dicyandiamide |
| 3 | bisphenol A | $BaSO_4$ | dicyandiamide |

All of the tested baked enamel layers 1, 2, and 3 have an epoxy resin base and 6 to 10% by volume of hardener, by contrast with the first baked enamel layer, the baked enamel layers 2 and 3 each have 5 to 20% by volume of a filler with a grain size of 0.6 to 3 μm. Preferably, the baked enamel layers 1, 2, and 3 each have 74 to 85% by volume of epoxy resin base or in general, an epoxy resin base in the form of a residue.

It is also conceivable for a plurality of hardeners to be used in the baked enamel layers. Preferably, an additional hardener is added, which, in comparison to the hardener dicyandiamide, reacts more quickly at room temperature and/or during the drying process of the baked enamel layer, for example at 180 to 240° C.—in this way, it is possible to adjust, for example, the viscosity of the baked enamel layer through pre-reaction with the epoxy resin base. This can advantageously also hinder a squeezing of the baked enamel layer during the adhesive packeting of sheet metal parts that have been cut from the sheet metal strip. It is conceivable, for example, to use cold-hardening amines (e.g.: AEP n-amino-ethyl piperazine or cycloaliphatic polyamine) as additional hardeners. In general, it should also be noted that the fillers according to the invention can be inactive fillers or active fillers that have been functionalized in this regard.

In general, it should be noted that the indicated percentages by volume refer to the total quantity of the solid of the baked enamel layer—and the above-mentioned percentages by volume, when added up, yield 100% by volume of the total quantity of the solid.

As shown in FIG. 1, peel strengths of electrical strips with the heat-hardening or heat-hardenable baked enamel layers 1, 2, and 3, which have been stored in coil form and then processed further to produce a laminated core through baking of the baked enamel layers 1, 2, and 3 are exhibited. In comparison to the electrical strip with the baked enamel layer 1, in the electrical strips with the baked enamel layers 2 and 3, a significantly higher peel strength was observed with a thermal aging after 200 hours of operation at 200 degrees Celsius, which is evident from the normalized curve of the peel strength in FIG. 1.

In addition, coils made of the electrical strips with the heat-hardening and thus still curable baked enamel layers 2 and 3 exhibited a high dimensional stability from the coiled state through to the further processing into laminated cores. This dimensional stability is also significantly higher than that of the coil made of the electrical strip with the heat-hardening and thus still curable baked enamel layer 1.

The invention claimed is:

1. An electrical strip or electrical sheet for producing a laminated core through baking of a heat-hardening hotmelt varnish, comprising:
   at least one heat-hardening hotmelt varnish provided on flat sides of the electrical strip or electrical sheet, which has an epoxy resin base, at least one hardener comprising a dicyandiamide base, and at least one filler, wherein the at least one filler in the heat-hardening hotmelt varnish is selected from the group consisting of: a metal carbonate, a metal sulfate, and any combination thereof, wherein the filler has an average grain size of 0.6 to 3 μm, and wherein the heat-hardening hotmelt varnish contains 7 to 16% by volume of filler.

2. The electrical strip or electrical sheet according to claim 1, wherein the heat-hardening hotmelt varnish contains:
   6 to 10% by volume of hardener; and
   74 to 85% by volume of epoxy resin as a base.

3. The electrical strip or electrical sheet according to claim 1, wherein the metal carbonate is calcium carbonate ($CaCO_3$).

4. The electrical strip or electrical sheet according to claim 1, wherein the metal sulfate is barium sulfate ($BaSO_4$).

5. The electrical strip or electrical sheet according to claim 1, wherein the at least one filler further comprises at least one of the group consisting of: zinc sulfide (ZnS), magnesium silicate ($MgO_3Si$), aluminum silicate, zinc phosphate $Zn_3(PO_4)_2$, and lithopone.

6. The electrical strip or electrical sheet according to claim 1, wherein the hotmelt varnish has at least two hardeners that have different reactivities with the epoxy resin base.

7. The electrical strip or electrical sheet according to claim 1, wherein the epoxy resin base is bisphenol A.

8. The electrical strip or electrical sheet according to claim 1, wherein the electrical strip or electrical sheet has the heat-hardening hotmelt varnish on both of its flat sides.

9. A coil comprising the electrical strip or electrical sheet according to claim 1, wherein the electrical strip or electrical sheet is wound.

10. The coil according to claim 9, wherein the coil has an increased dimensional stability compared to a coil without the filler.

11. A method of increasing dimensional stability of a coil, comprising:

using at least one of the group consisting of: a metal carbonate, a metal sulfate, and any combination thereof as a filler in a heat-hardening hotmelt varnish with an epoxy resin base and a hardener comprising a dicyandiamide base to coat an electrical strip or electrical sheet on at least one of its flat sides, wherein the filler has an average grain size of 0.6 to 3 μm, and the heat-hardening hotmelt varnish contains 7 to 16% by volume of filler; and forming the coil from the coated electrical strip or electrical sheet.

12. A method of increasing long-term temperature resistance of a laminated core; comprising:

using at least one of the group consisting of: a metal carbonate, a metal sulfate, and any combination thereof as a filler in a heat-hardening hotmelt varnish with an epoxy resin base and a hardener comprising a dicyandiamide base to coat an electrical strip or electrical sheet on at least one of its flat sides, wherein the filler has an average grain size of 0.6 to 3 μm, and the heat-hardening hotmelt varnish contains 7 to 16% by volume of filler; and baking the heat-hardening hotmelt varnish to produce the laminated core from the coated electrical strip or electrical sheet.

* * * * *